United States Patent [19]

McKnight et al.

[11] Patent Number: 5,246,203
[45] Date of Patent: Sep. 21, 1993

[54] OILFIELD VALVE

[75] Inventors: Devereux J. McKnight, New Iberia, La.; Brent H. McKnight, Corpus Christi, Tex.; James A. Cunningham, Patterson, La.

[73] Assignee: M&M Supply Co., New Iberia, La.

[21] Appl. No.: 906,055

[22] Filed: Jun. 29, 1992

[51] Int. Cl.$^5$ .............................................. F16K 5/06
[52] U.S. Cl. ................................... 251/315; 251/286; 137/454.2
[58] Field of Search .................. 251/286, 288, 315; 137/454.2

[56] References Cited

U.S. PATENT DOCUMENTS

| | | | |
|---|---|---|---|
| 1,906,266 | 5/1933 | Hoffman | 251/315 X |
| 3,039,484 | 6/1962 | Bredtschneider | 137/454.2 |
| 3,821,984 | 7/1974 | Lee | 251/315 X |
| 4,480,813 | 11/1984 | Holley | 251/315 X |
| 4,697,787 | 10/1987 | Pelleboer | 137/454.2 X |

Primary Examiner—John C. Fox
Attorney, Agent, or Firm—G. Turner Moller

[57] ABSTRACT

A valve comprises a valve body having threaded connections on each end. A unit handled valve mechanism includes a cage carrying a spring loaded floating valve ball. The valve mechanism is placed in and removed from the valve body without the use of special tools. The valve mechanism includes lip type polyseals allowing pressure from below to leak past a lower valve seat so pressure from below causes the valve ball to seal only against an upper seat assembly. The only segment of the valve ball in substantial compression is immediately adjacent the upper seat assembly. An actuator for the valve fits onto a connector between the actuator and ball in only one manner, so the indicator on the actuator correctly points at the correct indicia on the valve body describing the valve condition, i.e. open or closed. An improved connector between the actuator and the valve ball minimizes the potential of deformation due to abuse.

9 Claims, 3 Drawing Sheets

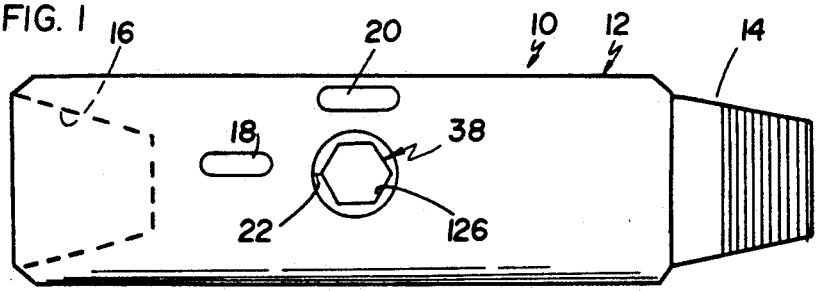
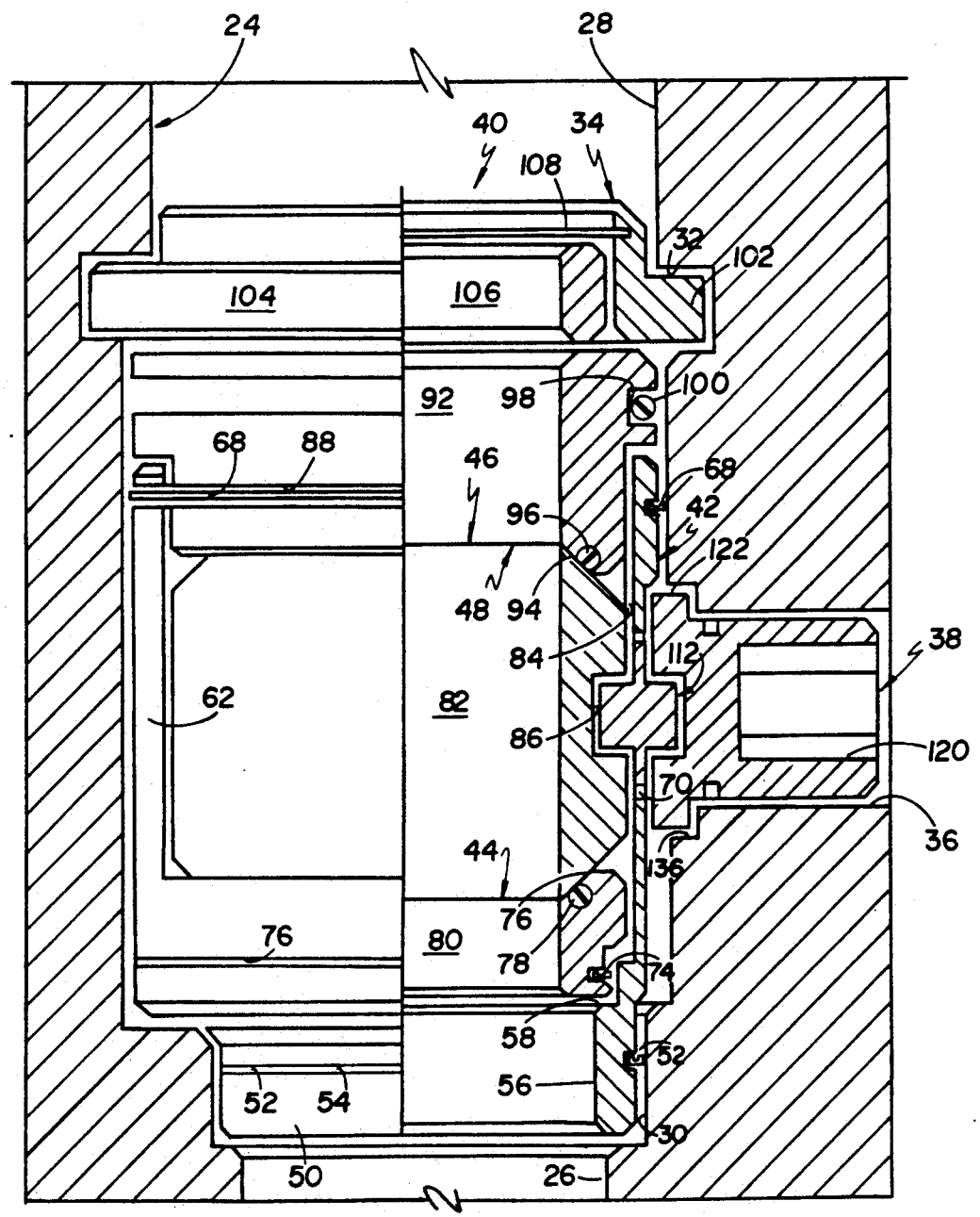

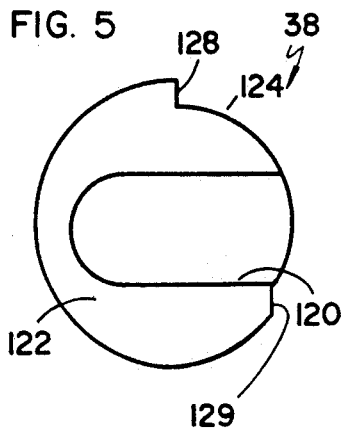
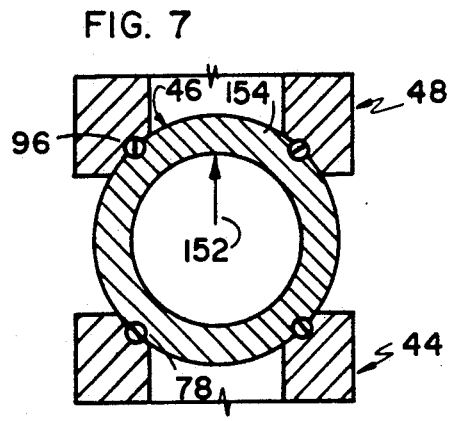
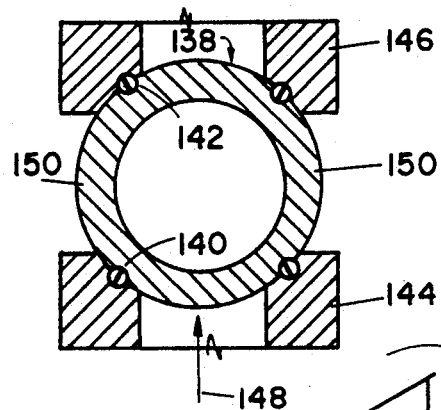
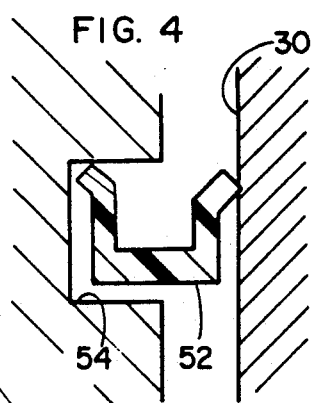
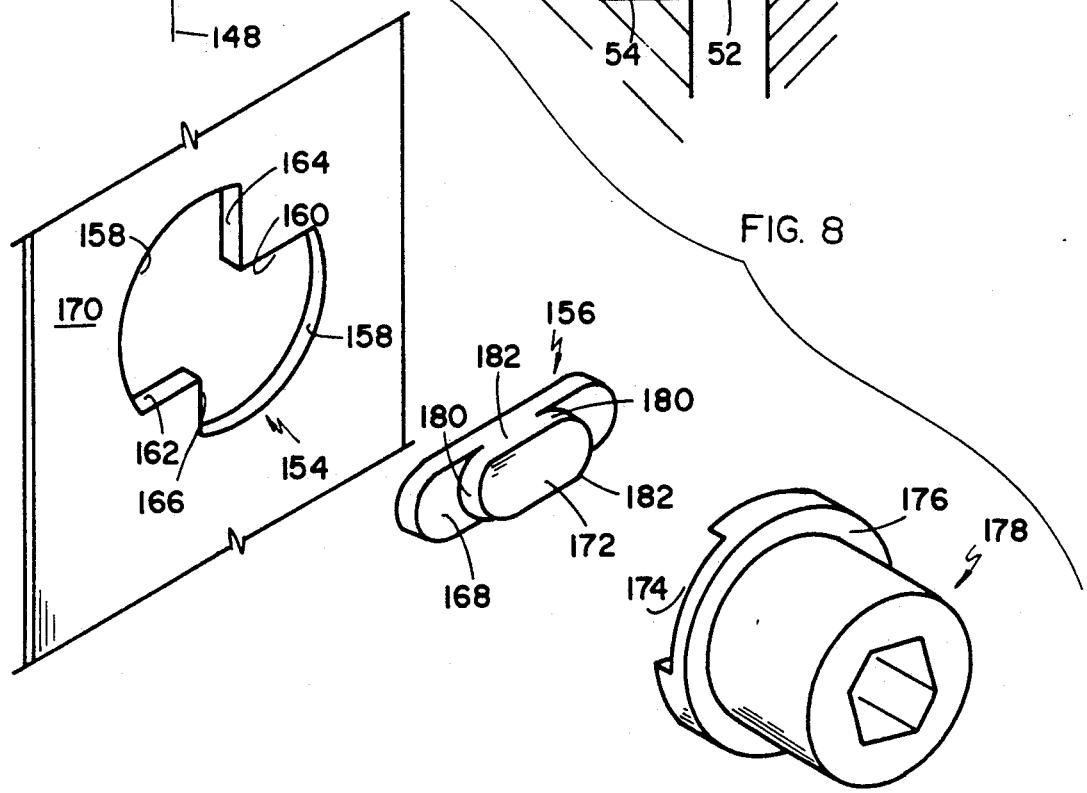

OILFIELD VALVE

This invention is an oilfield valve used in conjunction with drill and work strings used in the drilling, completion and workover of hydrocarbon wells.

In the drilling of oil or gas wells with standard U.S. technology, a drive bushing is turned by a rotary table. The drive bushing has a square or hexagonal passage therethrough slidably receiving a long square or hexagonal member known as a kelly. The drill string comprising a plurality of joints of drill collars and drill pipe attaches to threads at the bottom of the kelly. A travelling block is suspended by cables in the derrick and supports the upper kelly end. Rotation of the rotary table causes the kelly to rotate thereby rotating the drill string. As hole is made, the driller lowers the travelling block thereby allowing the kelly to slide through the drive bushing. When drilling has proceeded to the point where the top of the kelly approaches the drive bushing, the drill string is raised and then suspended by slips from the drive bushing, the kelly is unthreaded from the top joint of the drill string and a new joint of pipe is attached between the kelly and the drill string suspended in the drive bushing. Those skilled in the art will recognize this as a summary of drilling with standard U.S. technology.

One potential hazard in drilling for oil or gas is encountering pressures which are not balanced by drilling fluid in the hole. One of many precautions or safety devices are valves on the kelly, on the lower end immediately above the uppermost drill pipe joint and on the upper end between the kelly and the swivel. The idea is to actuate the blowout preventer to seal around the outside of the drill string and to close the kelly valve or valves to keep well fluids from returning through the drill string. An analogous valve, known as a safety valve, is used in analogous situations in completion and workover operations. Although this invention has application in upper kelly valves and safety valves, it will be described as a lower kelly valve.

Lower kelly valves are a different breed from most valves and have a number of unusual features. Foremost, they must be rugged and capable of withstanding the use and abuse of drilling operations. They are almost always open to allow the passage of drilling mud therethrough but must be easily closed when an emergency arises. The actuating mechanism must be recessed, or nearly so, within the valve body so it can pass through the drive bushing. For many years, the standard kelly valve was known as a TIW valve, after its originator Texas Iron Works. The valve housing of original TIW valves were made in halves and screwed together. In recent years, Hydril has become the industry leader in kelly valves. To some extent, this occurred because the current Hydril valve bodies are of one piece and are shorter and therefore lighter than the older TIW valves. Typical modern lower kelly valves are found in U.S. Pat. Nos. 3,066,590; 3,941,348; 4,417,600; 4,467,823; 4,480,813; 4,523,608; 4,681,133 and 4,795,128.

The most popularly used kelly valves require special tools to disassemble. Thus, replacement of worn seals must be done by specially equipped service personnel or by special tools which may be kept on the drilling rig. Most drilling contractors will go to great lengths to avoid buying, maintaining and keeping track of special tools to repair or maintain equipment on a drilling rig or to train personnel to perform this task.

Disclosures of some interest relative to this invention are U.S. Pat. Nos. 3,937,441 and 4,254,836.

The lower kelly valve of this invention comprises a unitary valve body having a cage or carrier in which the valve member is mounted. The carrier is secured in the valve body with a retaining ring or other suitable fastener. Thus, the carrier may be bodily installed and removed from the valve body without the use of special tools. When the seals in the valve of this invention begin to leak, the valve is removed from the kelly and the cage is removed from the valve body. Preferably, a new or rebuilt assembly may be procured and installed in the valve if time is of the essence or the seals may be replaced if circumstances allow.

Most kelly valves presently use a spherical valve ball having an axial passage therethrough. The valve ball is of the floating type, as opposed to a trunnioned valve ball, so limited axial movement of the valve ball is allowed. The valve ball seals against appropriately placed annular seals. In some situations, kelly valves are designed to accommodate $H_2S$ exposure because a trace of $H_2S$ is often found in drilling mud and, if the kelly valve is used in earnest, there is often a lot of $H_2S$ in the oil or gas coming up through the drill pipe. The major short term effect of $H_2S$ on iron alloys is to make them hard and consequently brittle so they develop cracks. Thus, the valve ball of a kelly valve intended to be used in an $H_2S$ environment is normally made of relatively soft iron alloys which can accommodate some $H_2S$ hardening without becoming overly brittle.

A problem recognized by this invention is that conventional valve balls are sealed in a manner so that the force resisted by pressure from below is transmitted across the valve ball thereby placing the valve ball in compression tending to deform it from acceptable roundness by deforming the relatively narrow metal sections between the passage and the ball exterior. In one sense, this is very odd because the valve ball is being stressed in its weakest direction, i.e. across its diameter. In this invention, pressure from below leaks across the bottom end of the valve ball to force the upper end of the ball against a seat. In this fashion, the only part of the ball placed in substantial compression is one arcuate side, i.e. in an area of much higher strength. This feature not only has great utility in valves intended for use in $H_2S$ environments, it also makes substantial sense in conventional kelly valves.

It is an object of this invention to provide an improved valve for use in drilling, completion and workover operations.

Another object of this invention is to provide a kelly or safety valve in which a cage carries the valve mechanism and may be placed in and removed from the valve body without the use of special tools.

A further object of this invention is to provide a kelly or safety valve having a ball member which seats in such a fashion that compressive loads from pressure acts in a preferred manner.

These and other objects of this invention will become more fully apparent as this description proceeds, reference being made to the accompanying drawings and appended claims.

IN THE DRAWINGS

FIG. 1 is a side elevational view of a kelly valve of this invention;

FIG. 3 is a partially exploded isometric view of the valve mechanism of this invention, certain parts being broken away for clarity of illustration;

FIG. 4 is an enlarged view of one of the polyseals of the valve mechanism of FIG. 3;

FIG. 5 is an end view of the valve actuator of FIG. 3;

FIG. 6 is a partial cross-sectional view illustrating selaing of the valve ball of the prior art;

FIG. 7 is a partial cross-sectional view, similar to FIG. 5, illustrating sealing of the valve ball of this invention;

FIG. 8 is an enlarged isometric view of another embodiment of a valve actuator f this invention, illustrating the cooperation between the valve actuator and the cage.

Figure 2:
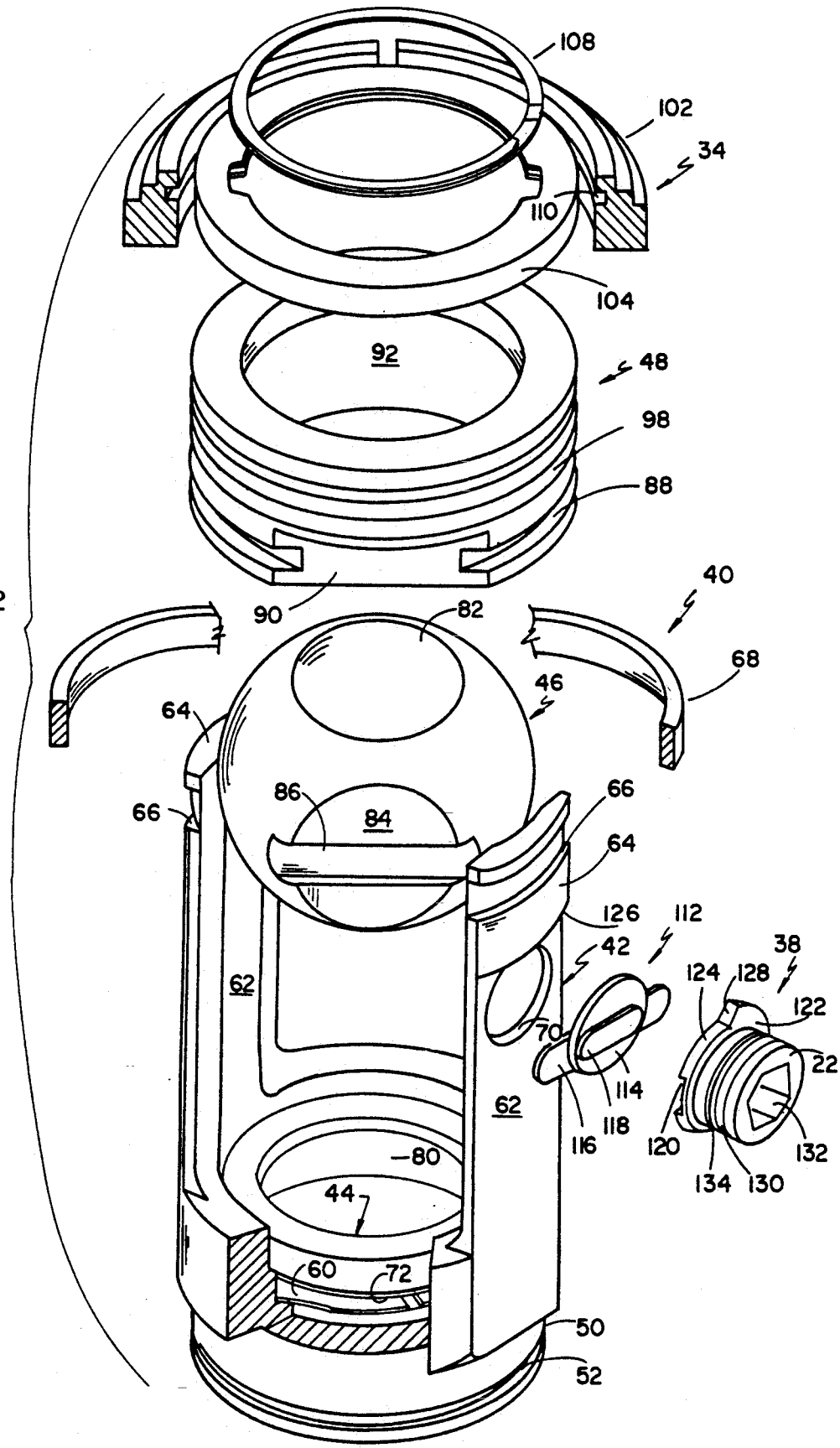
FIG. 2 is an enlarged broken view of the kelly valve of FIG. 1.

Referring to FIGS. 1 and 2, a kelly valve 10 of this invention comprises a one piece housing or valve body 12 having a threaded drill pipe pin 14 at the lower end and a threaded drill pipe box 16 at the upper end. Indicia 18, 20 stamped or forged into the housing 12 cooperate with a pointer 22 for designating whether the valve is open or closed.

The valve body 12 provides an axial pressure 24 therethrough including a relatively small lower passage section 26, a relatively large upper passage section 28 and an intermediate sized recess 30 connecting the sections 26, 28. The upper passage section 28 provides an enlarged recess 32 receiving a locking assembly 34 as more fully explained hereinafter. A transverse passage 36 opens into the upper passage section 28 exposing an actuator 38 to the exterior of the valve body 12 so the valve mechanism may be manipulated.

Removably placed in the lower end of the upper passage 28 and in the recess 30 is a valve mechanism 40 comprising, as major components, a cage or carrier 42, a lower seat assembly 44, a floating valve ball 46 and an upper seat assembly 48. The valve mechanism 40 is positioned and held in the valve body 12 by the locking assembly 34. As will be more fully apparent hereinafter, the actuator 38 cooperates with the valve ball 46 for positioning the valve ball 46 in open and closed positions, sealing against the upper and lower seat assemblies 44, 46.

The cage or carrier 42 provides a lower end 50 sized to be closely received in the intermediate recess 30. One or more lip type seals 52, known in the trade as polyseals, fit in a groove 54 provided by the lower cage end 50, as shown best in FIG. 4. As explained more fully hereinafter, the seal 52 allows pressure leakage from below and seals against pressure from above. The lower cage end 50 provides a central passage 56 and a lip 58 for receiving a wave shaped spring or springs 60 for purposes more fully apparent hereinafter.

A pair of ears 62 extend upwardly from the lower cage end 50 and terminate in enlarged ends 64 providing a groove 66. A split ring band 68 in the groove 66 captivates the upper seal assembly 48 in position on top of the valve ball 46. One of the ears 62 provides an opening 70 for purposes more fully explained hereinafter.

The lower seat assembly 44 rests on top of the wave spring 60 and provides an external groove 72 receiving a second lip type polyseal 74 allowing pressure leakage from below but sealing in response to pressure from above against the inside of the cage 42. The upper end of the seat assembly 44 provides an inclined surface 76 providing a conventional Teflon O-ring 78 sealing against pressure from either direction. The lower seat assembly 44 provides a central passage 80 for delivering drilling fluid therethrough.

The valve ball 46 is of conventional construction having a central passage 82 and a smooth exterior sealing surface providing a flat spot 84 having a groove 86 for purposes more fully explained hereinafter. The valve ball 46 may be required to be made of a relatively soft iron alloy as is typical of valve balls used in lower kelly valves designed to accommodate $H_2S$. The major short term effect of $H_2S$ on iron alloys is to make them hard and consequently brittle so they develop cracks. Thus, the valve ball 46 may be of a relatively soft iron alloy which can accommodate some $H_2S$ hardening without becoming overly brittle.

The upper seat assembly 48 is of generally cylindrical external shape having a lower circumferential groove 88 opening into a pair of oppositely spaced recesses or flats 90. In FIG. 3, the upper seat assembly 48 is turned about 45° so the upper ends arm ends 64 fit into the flats 90. The groove 66 in the upper end of the cage 42 is sized and positioned to be an extension of the groove 88 when the upper seat assembly 48 is placed on the cage 42. Thus, the spring ring 68 captivates the upper seat assembly 48 to the cage 42.

The upper seat assembly 48 provides an inner passage 92 and an inclined surface 94 having a Teflon O-ring seal 96 sealing against the exterior of the valve ball 46. One or more external grooves 98 receives an O-ring 100 sealing against the passage 28 of the valve body 12.

The valve mechanism 40 is retained in the valve body 12 by the locking assembly 34 which comprises a plurality of ring segments 102 received in the recess 32. The ring segments 102 are passed, one at a time, downwardly through the passage section 28 to rest on top of the upper seat assembly 48 and are then moved radially outwardly into the recess 32. After the ring segments 102 are in the recess 32, a one piece support ring 104 having a passage 106 therethrough is placed inside the ring segments 102. The support ring 104 prevents the ring segments 102 from unintentionally moving radially inward which would release the valve mechanism 40 from connection with the valve body 12. A retaining ring 108 is radially contracted, positioned adjacent a recess 110 in the ring segments 102 and then allowed to radially expand to keep the support ring 104 in position. The retaining ring 108 is removed from its groove by pliers and a screwdriver.

The valve ball 46 is turned by the actuator 38 acting on a stem/ball connector 112 which includes a central disc 114 sized to fit loosely in the opening 70 of the ear 62. A tongue shaped rib 116 extends along the inside of the disc 114 and fits snugly in the groove 86 provided by the valve ball 46. A rib 118 on the outside of the disc 114 fits in a groove 120 provided on the inside end of the actuator 38. The groove 120 opens through only one side of a flange 122 so the actuator 38 can only be installed correctly. The indicating mark 22 necessarily points in the correct direction so the indicia 18, 20 always show the correct condition of the valve 10. If the groove 120 opened in both directions through the flange 122, the actuator 38 could, and undoubtedly would at times, show the wrong condition of the kelly valve 10.

One of the functions of the actuator 38 is to rotate the valve ball 46 not more than 90° when the actuator 38 is fully turned. To this end, the flange 122 is cam shaped having a section 124 of reduced radial extent which clears a ledge 126 on the bottom of the arm end 64 as shown best in FIG. 2. As the actuator 38 approaches the closed position, an abutment 128 engages the ledge 126 and prevents further rotation of the actuator 38. Similarly, an abutment 129 prevents overrotation of the actuator 38 in the valve opening direction. The actuator 38 includes a stem 130 having a polygonal wrench fitting 132 which is preferably a recess to receive a hex or Allen wrench. The stem 130 provides one or more O-rings 134 for sealing against the passage 36.

Assembly of the valve mechanism 40 should now be apparent. The wave spring 60 is dropped into the cage 42 to rest on the lip 58. The lower seat assembly 44 rests on top of the wave spring 60. The stem/ball connector 112 is placed in the opening 70 and the valve ball 46 lowered into the cage 42 to position the disc key 116 into the ball groove 86. The upper seat assembly 48 is placed so the flats 90 receive the upper arm ends 64. The assembly 48 thereby rests on top of the valve ball 46. The upper seat assembly 48 is forced downwardly against the wave spring 60 so the split ring 68 fits in the grooves 66, 88 to captivate the upper seat assembly 48 on the cage 42. The wave spring 60 thus provides the force for holding the seat assemblies 44, 48 and the valve ball 46 in a close spring tensioned sealing fit.

Assembly of the valve mechanism 40 in the valve body 12 should now be apparent. The actuator 38 is placed in the passage 36 from the central passage 24 so the flange 122 is in a recess 136. The actuator 38 is turned so the opening of the slot 120 faces upwardly to receive the rib 118 of the connector 112 as the lower valve seat end 50 slides downwardly into the recess 30. The ring segments 102 are individually placed on top of the upper seat assembly 48 and shifted radially outwardly into the recess 32. The support ring 104 is dropped into the ring segments 10 and the retaining ring 108 placed in the groove 110.

Removal of the valve mechanism 40 is likewise apparent. The retaining ring 108 is removed from the groove 110 with a screwdriver and pliers. Although the normal operating position of the valve is open, the actuator 38 is turned to close it so the valve ball 46 can be tapped on. Normally, the valve mechanism 40 will slide out of the passage with a little assistance from the bottom. If the valve mechanism 40 is jammed tight in the passage 24, as may occur because of the accumulation of cement, dried drilling mud or the like, the housing 12 is turned upside down and a board or hammer handle placed through the pin end 14 to engage the bottom of the closed valve ball 46. The board is struck with a sledge hammer and the mechanism 40 slides toward the box end 16 of the housing 12 and is easily removed.

This is in contrast with prior art floating ball type kelly valves having a unitary housing. In these devices, a wheel or gear puller grasps the analogous split rings and forces them toward the analogous wave spring. If cement or dried mud has accumulated in the valve, the split rings cannot move axially so the valve cannot be disassembled. Thus, the prior art split rings are stressed by the wave spring and, in this invention, the split rings are not stressed since the wave spring ultimately reacts against the cage.

Thus, the valve mechanism 40 provides a unit handled assembly which can be easily and quickly removed from the valve body 12 with a minimum of effort, at great speed and without needing special tools. These characteristics are helpful at any time and crucial to replace a leaking kelly valve in anything approaching an emergency. When used in two piece valve housings, as may be typical for other kelly valve designs and/or safety valves, the valve mechanism 40 is also easily removed because the valve housing sections are typically threaded together.

Referring to FIGS. 6 and 7, the difference between the sealing characteristics of the prior art and this invention are illustrated. In FIG. 6, a prior art valve ball 138 is sealed by Teflon O-rings 140, 142 or metal-to-metal seals (not shown) against lower and upper seat assemblies 144, 146 and typical O-rings (not shown) seal the valve seat to the internal valve housing. Thus, pressure from below during blow out conditions creates a force 148 acting on the lower surface of the valve ball 138. Because the valve ball 138 is sealed against the seat 144 and the seat 144 is sealed against the adjacent housing, the force 148 tends to flatten the valve ball 138 and is resisted by the weakest portion of the valve ball 138, i.e. the metal sections 150. In contrast, in FIG. 7, pressure from below leaks past the seals 52, 74 and gets inside the valve ball 46 to act as a force 152 on the inside of the valve ball 46. Thus, the only segment of the valve ball 46 of this invention in substantial compression is a segment 154 immediately adjacent the upper seat assembly 48. Any valve ball is inherently capable of withstanding greater loads in the arrangement of FIG. 7 than the arrangement of FIG. 6. This is particularly important in kelly and safety valves because ratings in the range of 10,000-15,000 psi are often required.

In retrospect, this is an odd problem because one of the prior art lower kelly valves has a solution to prevent flattening of the valve ball due to pressure applied from above. In this prior art valve, the upper valve seat and valve ball are biased together by a similar wave spring reacting against an analogous set of retaining rings. When pressure is applied from above, the retaining ring structure, upper valve seat and valve ball move axially toward the wave spring. To prevent overstressing of the valve ball, a secondary set of retaining rings limits axial movement of the upper valve seat thereby allowing the valve ball to move away form the upper valve seat and therefore leak in response to excessively high pressures. This prevents the valve ball from being flattened in response to pressure from above. In a way, this is very odd because kelly valves are not intended as a safety feature against pressure form above - it is blow out pressures that kelly valves are designed to overcome.

Overrotation of floating valve balls is a long standing problem in kelly valves and the solution shown in FIG. 2 is well known, i.e. provide a shoulder 128 on the actuator 38 to engage a stationary abutment somewhere on the valve or valve housing. A problem with this arrangement is the shoulder 128 is necessarily of rather small cross-section so it is much too readily deformed when drilling crews open or close the kelly valve.

To obviate this problem, the cage arm opening 154 and stem/ball connector 156 are modified as shown in FIG. 8. The opening 154 includes a pair of circular arc segments 158, a pair of parallel shoulder segments 160, 162 corresponding to a valve closed position and a pair of parallel shoulder segments 164, 166 corresponding to a valve open position. The shoulder segments 160, 162 are accordingly substantially perpendicular to the shoulder segments 164, 166.

The connector 156 comprises an elongate body having a base 168 sized and shaped to fit into the groove 86 of the valve ball 46. The front surface of the base 168 rests against the back of the cage arms 170 thereby preventing movement of the connector 156 outwardly through the opening 154. A rib 172 is sized and shaped to fit in a slot 174 provided in a flange 176 of an actuator 178. The slot 174 is analogous to the slot 120 in that it opens in only one direction out of the flange 176 so the actuator 178 can be installed in only one direction. The rib 172 provides edges 180 describing a circular arc so the rib 172 rotates in the opening 154 between a valve closed position in which edges 182 of the connector 156 abut the shoulder segments 164, 166 and a valve open position in which the edges 182 abut the shoulder segments 106, 162. It will be a parent that the cross-sectional area of the connector 156 abutting the shoulders 160, 162 or abutting the shoulders 164, 166 is much larger than the area of the abutments 128, 129 and therefore is not subject to severe deformation.

Although this invention has been disclosed and described in its preferred forms with a certain degree of particularity, it is understood that the present disclosure of the preferred forms is only by way of example and that numerous changes in the details of construction and operation and in the combination and arrangement of parts may be resorted to without departing from the spirit and scope of the invention as hereinafter claimed.

I claim:

1. A valve comprising
a housing having an axial passage therethrough and a lateral passage opening into the axial passage;
a unit handled valve mechanism sized to move bodily into the axial passage and including a cage, a lower valve seat carried by the cage, a valve ball carried by the cage and abutting the lower valve seat, an upper valve seat carried by the cage and abutting the valve ball, a connector engaging the valve ball for rotating the valve ball and means connecting the cage, lower valve seat, valve ball and upper valve seat together, and spring means abutting the cage and the lower valve seat for biasing the lower valve seat and the valve ball toward the upper valve seat;
means for securing the valve mechanism in the axial passage; and
an actuator extending through the lateral passage and attached to the connector for rotating the valve ball.

2. The valve of claim 1 wherein the axial passage includes a first section, extending from a first end of the housing, of a predetermined size, the cage is sized to pass through the first section and the securing means comprises means accessible through the axial passage.

3. The valve of claim 2 wherein the securing means comprises means placed through the first section for securing the cage therein.

4. The valve of claim 3 wherein the first section of the axial passage provides a recess therein, the securing means comprising a plurality of ring segments extending into the recess and providing a first axial opening therethrough, a unitary back up ring in the first axial opening preventing radially inward movement of the ring segments, and a snap ring connected to the ring segment preventing axial movement of the back up ring.

5. The valve of claim 2 wherein the axial passage provides a second section, extending from a second end of the housing, of a predetermined size smaller than the first section, at least a portion of the cage being larger than the second section.

6. The valve of claim 5 wherein the axial passage provides a recess between the first and second sections of a size intermediate the first and second sections, the cage providing a lower end in the recess and means sealing between the lower end and the recess.

7. The valve of claim 1 wherein the cage provides
a lower cage end providing an axial passage therethrough, and
a pair of ears connected to the lower cage end and extending axially away therefrom to an ear upper end,
the lower seat assembly resisting in the axial passage of the cage lower end,
the upper seat assembly being connected to the upper ends.

8. The valve of claim 7 wherein one of the ears provides an opening therethrough aligned with the lateral housing opening, the ear opening providing a first pair of shoulders corresponding to the valve closed position and a second pair of shoulders corresponding to the valve open position, the connector being mounted in the ear opening for rotational movement and abutting the first pair of shoulders in the valve closed position and abutting the second pair of shoulders in the valve open position.

9. A valve comprising
a housing having an axial passage therethrough and a lateral passage opening into the axial passage;
a unit handled valve mechanism sized to move bodily into the axial passage and including
a cage,
a lower valve seat carried by the cage,
a valve ball carried by the cage and abutting the lower valve seat,
an upper valve seat carried by the cage and abutting the valve ball,
a connector engaging the valve ball for rotating the valve ball and means connecting the cage, lower valve seat, valve ball and upper valve seat together,
the cage providing a lower cage end having an axial passage therethrough and a pair of ears connected to the lower cage end and extending axially away therefrom to an ear upper end, the lower seat assembly residing in the axial passage of the cage lower end, the upper seat assembly being connected to the ear upper ends, wherein one of the ears provides an opening therethrough aligned with the lateral housing opening, the ear opening providing a first pair of shoulders corresponding to the valve closed position and a second pair of shoulders corresponding to the valve open position, the connector being mounted in the ear opening for rotational movement and abutting the first pair of shoulders in the valve closed position and abutting the second pair of shoulders in the valve open position;
means for securing the valve mechanism in the axial passage; and
an actuator extending through the lateral passage and attached to the connector for rotating the valve ball.

* * * * *